April 20, 1954 G. W. HAMPE ET AL 2,676,208

FREQUENCY INVERSION

Filed Nov. 15, 1950 3 Sheets-Sheet 1

INVENTORS.
GEORGE W. HAMPE
BEN WADE STORER, JR

BY Brown, Jackson, Boettcher & Dienner

ATTORNEYS

INVENTORS.
GEORGE W. HAMPE
BEN WADE STORER, JR
BY Brown, Jackson, Boettcher & Dienner
ATTORNEYS INVENTORS.
GEORGE W. HAMPE
BEN WADE STORER, JR
BY Brown, Jackson, Boettcher & Dienner
ATTORNEYS Patented Apr. 20, 1954

2,676,208

UNITED STATES PATENT OFFICE 2,676,208

FREQUENCY INVERSION

George W. Hampe, Hinsdale, and Ben Wade Storer, Jr., Chicago, Ill.

Application November 15, 1950, Serial No. 195,886

20 Claims. (Cl. 179—2)

The present invention relates in general to protective pilot relaying systems and in particular to improved pilot relaying systems which are capable of providing other types of miscellaneous services during the idle periods of the relaying equipment.

With the rapid development and expansion of the modern power line networks responsive to the constantly increasing demands of the consumers, the systems have become somewhat complex and spread out in structure, and the problem of providing reliable and satisfactory power supply to the farflung consumers has become increasingly difficult. With the advancement of the art, experience has proven that economical and reliable control of these cephalopodic type networks can be best attained by the systematic division of the power lines into predetermined local sections, each of which is equipped with an individual protective system.

With the occurrence of a fault in a particular section, the system protective equipment associated with that section becomes operative to cut off or isolate such section from the system to thus prevent disturbance or interference with the power supply to the neighboring sections and the rest of the network. During the progression of the art, the industry has gradually developed various types of equipment which are capable of automatically supervising and protecting these sections, the more favored type being the well known carrier current pilot type relaying systems.

In systems of this type, the transmission lines are divided into predetermined sections, each section having a circuit breaker unit and associated protective equipment at either end or terminal for controlling the connection or disconnection of the section to the main power busses. Generally speaking, the carrier current protective system is basically operated to automatically prevent the tripping of the circuit breakers at either end responsive to the occurrence of certain fault conditions (as for example, an external fault) and to accomplish tripping thereof responsive to occurrence of an internal fault on the transmission line or its terminal apparatus.

The two more common types of carrier relaying equipment used in the field today include the directional comparison relaying and the phase comparison relaying systems. Generally speaking, the object or function of the systems are comparable, that is, whenever a fault occurs, the transmission or cessation of carrier currents over the pilot channel controls receiver equipment at each end of the protected section. If the fault current is flowing through the protected line section to an external point the carrier transmission is operative to prevent tripping of the breakers for the section to which the fault is external. If the fault is internal to a protected section the carrier controls effect tripping of the circuit breakers therefore, and the isolation of that section from the system.

In practice, the operation of the equipment to send the protective carrier current over the associated protected section to control the circuit breakers in this manner is effected at rather infrequent intervals, the total effective time of such function being, in most instances, in the nature of a few seconds a year. From an economic standpoint, therefore, it is desirable that the carrier protective equipment be also adapted to provide other types of miscellaneous services during the periods that the relaying equipment is idle. Various types of miscellaneous services which might be effected jointly with the described relaying functions include voice communication, sleet detection, telemetering, load control, and supervisory control. While the adaption of carrier systems to include these miscellaneous services has been considered and occasionally applied heretofore, there have been certain serious shortcomings which have arisen in their commercial application.

One of the principal disadvantages of previously known systems which incorporated miscellaneous service jointly with the relaying protective function of the carrier channel, is the tendency of the miscellaneous service to simulate the relaying signals and in so doing provide a false signal which improperly operates the relay equipment. This particular difficulty in maintaining a strict divisional line between the miscellaneous service function and the relaying function occurs most frequently when there is no assured source of fault current at one terminal of the protected line section. For example, an open circuit breaker at one end of the protected section is frequently responsible for such condition. If an internal fault occurs while such condition exists in known types of systems, the miscellaneous service signals will frequently prevent the tripping of the circuit breaker at the other end of the protected section and serious consequences may develop. Since there are at least six different ways in which a given terminal will fail to supply fault current, the maintenance of this divisional line of control has proven to be a serious and insurmountable problem in the field.

These and other shortcomings of the known carrier relaying systems have been long recognized in the art and there have been several attempts to solve this conflict of operation and to award a priority of control to the carrier current relay equipment. One of these methods comprises the provision of a system in which basic carrier frequency is used by itself in providing miscellaneous services, and audio tones are superimposed upon the basic carrier frequency only when the relaying function is to be accomplished. While this particular method has certain advantages, it is considered impractical for phase comparison relaying systems. Additionally, in its use with other well known types of carrier protective systems (for example, the directional comparison relaying system) the arrangement involves the use of a large amount of added equipment and a severe limitation of the non-relaying usages. Accordingly, the method has not proven to be an adequate answer to the problem of providing a strict line of division between the carrier relaying and miscellaneous use functions of the protective equipment.

The second method of providing priority to the relaying function comprises the installation of the voltage responsive equipment at the terminal which will pass no fault current. Such device however requires the addition of potential transformers to the line to effect the provision of adequate voltage control and is extremely expensive in its application. Further, since the voltage responsive device detects certain types of fault by the corresponding voltage dips, they will also act whenever the line is deenergized whereupon additional equipment is needed to restore the equipment for non-relaying usages.

Thus while the field has long been familiar with the problems of effecting a distinct line of division between relaying functions and the miscellaneous services when used jointly on a carrier current protective system, there has been no adequate solution to the problem heretofore. There is a need in the field, therefore, for a method of and apparatus for providing carrier relay control and associated miscellaneous services which is relatively simple and inexpensive, and which offers a minimum of interference between the relaying and non-relaying functions of the carrier protective system; and it is the object of this invention to provide such type equipment.

A specific feature of the invention is the manner in which the novel apparatus and method disclosed are adapted for use in both the phase comparison and directional comparison relaying type systems, whereby an extremely flexible and economical type arrangement is effected.

An important feature of the invention is the manner in which the equipment is operative to provide proper line protection even though one terminal of the protected section is without an assured source of fault current.

A further feature of the invention is the manner in which the main object of the invention is accomplished through the use of only two carrier frequencies whereby unnecessary crowding of the carrier spectrum is alleviated. Such feature is particularly important in view of the fact that the provision of operative carrier equipment for resonance at two frequencies is more readily and economically accomplished without resorting to the use of additional separate equipment such as is necessary when more than two frequencies are used.

Another feature of the invention is the manner in which the new and novel equipment may be applied to a three terminal line which employs voice communication between two terminals and carrier relaying between all terminals.

Other important objects and features of the invention will become apparent with reference to the following disclosure and the drawings in which.

Figure 3A:
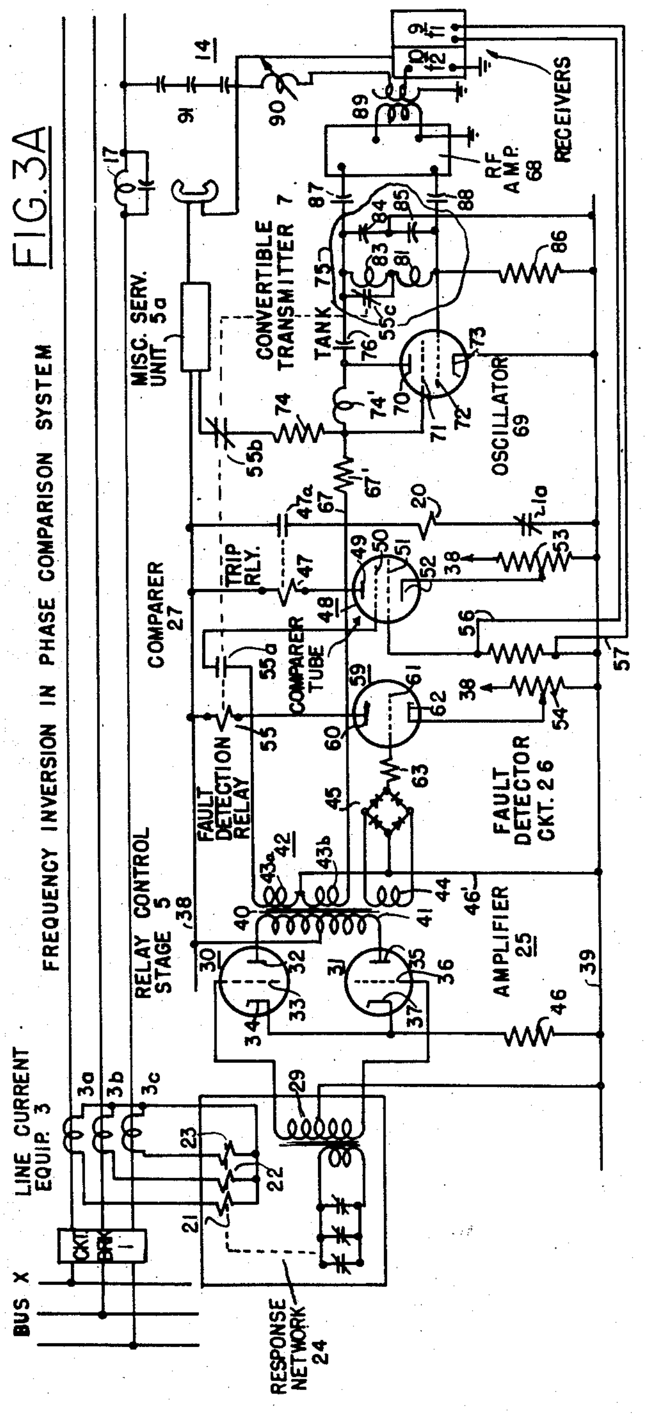
Figures 1, 3B:
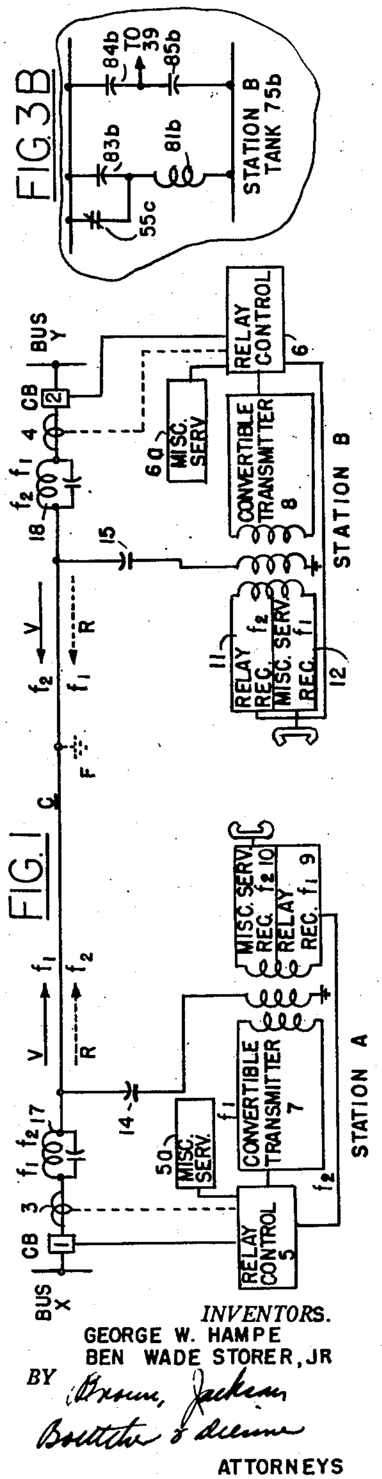
Figure 1 is a block schematic sketch of the novel frequency inversion arrangement as applied to a relay protective system in which single convertible transmitters are used at each terminal.
Figures 2, 4A, 4B:
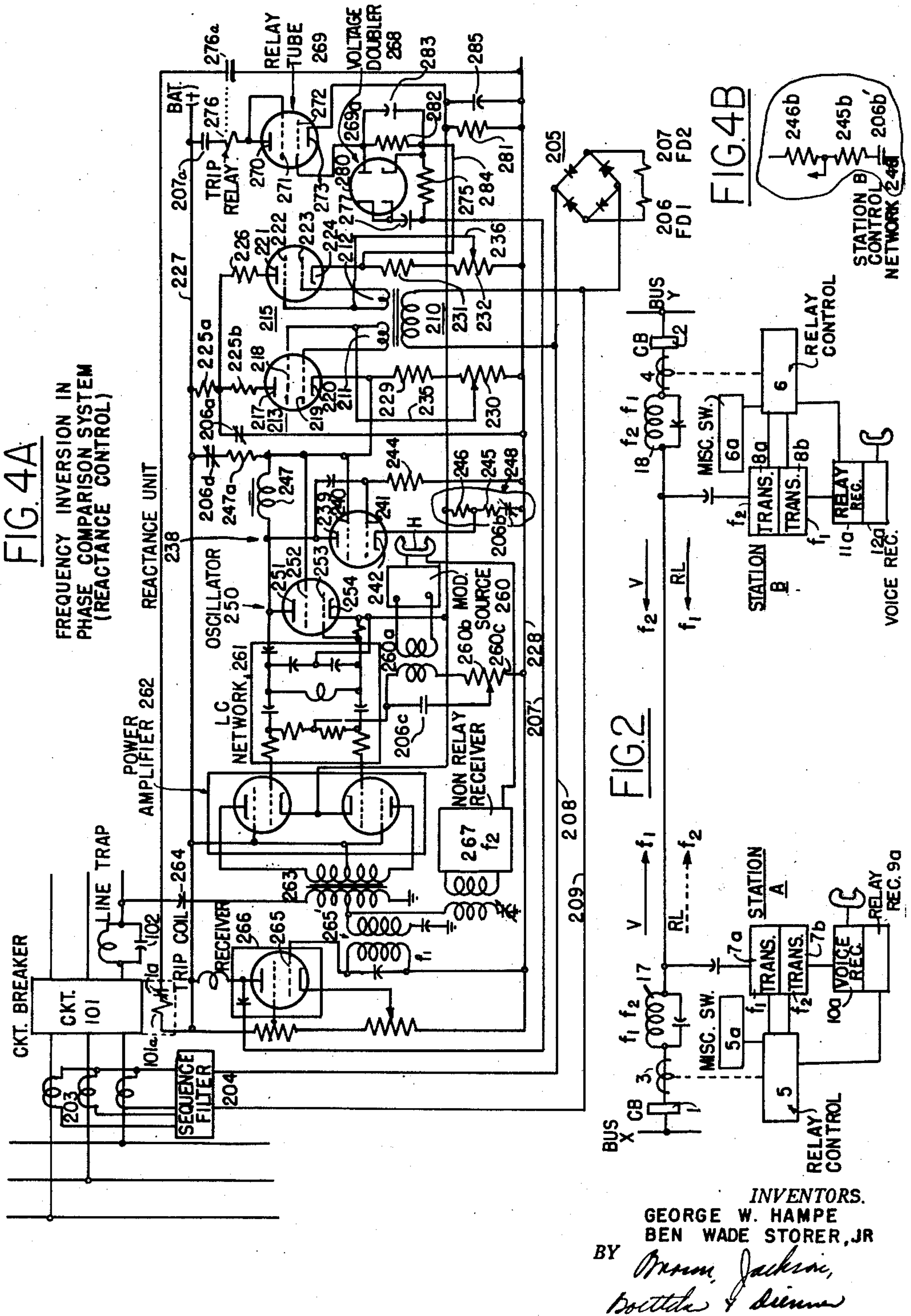
Figure 2 is similar to Figure 1 and illustrates an alternative arrangement including two transmitters at each terminal in lieu of the single convertible transmitter used thereat in Figure 1.
Figure 5:
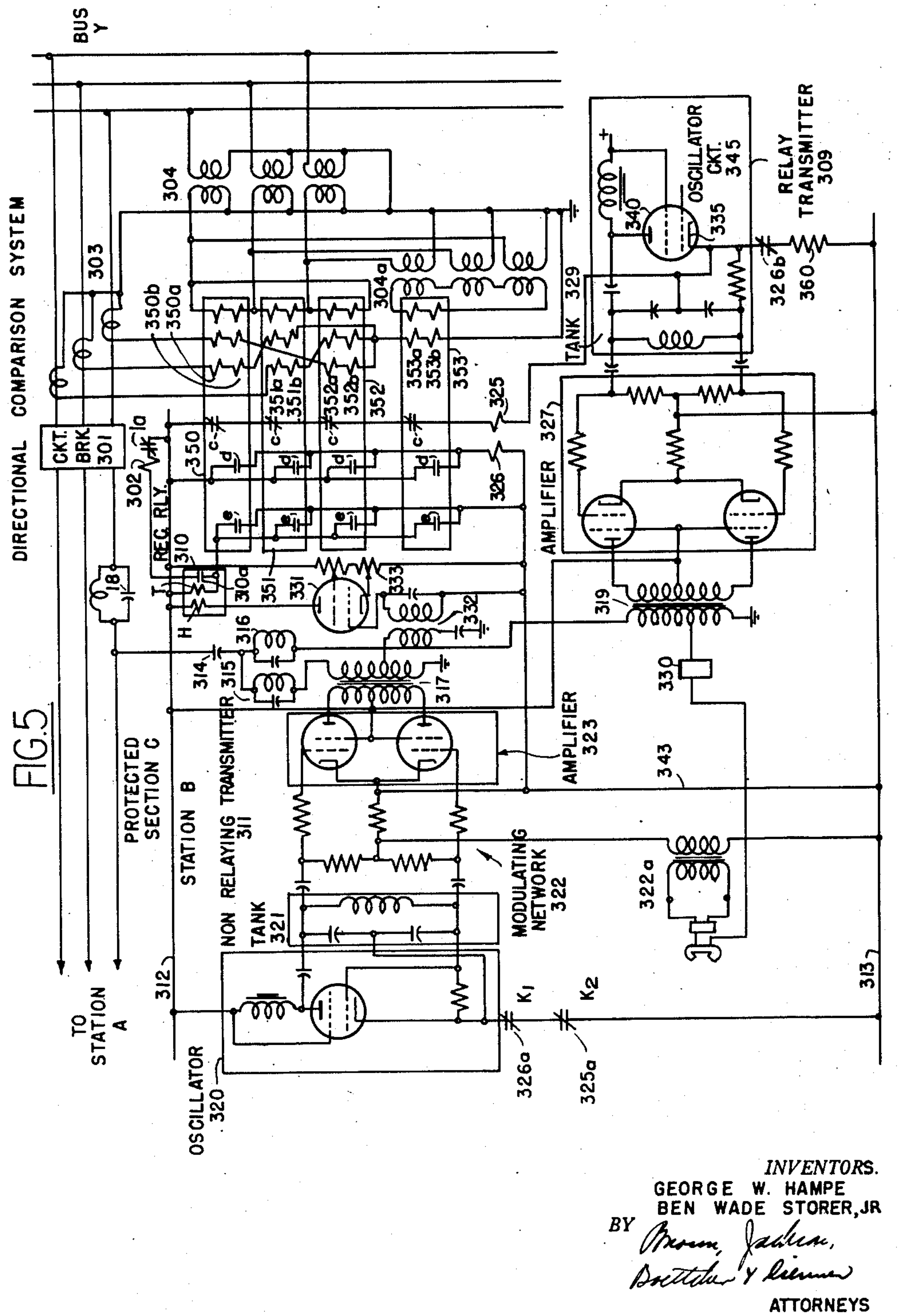

Figure 3*a* is a detailed diagram of the equipment used at one station of a phase comparison relaying scheme which includes the novel frequency inversion arrangement;

Figure 3*b* is an illustrative disclosure of the manner in which the second station of the phase comparison system shown in Figure 3*a* is to be modified;

Figure 4*a* illustrates the equipment used at one station in a phase comparison relaying scheme with frequency inversion in which inversion is controlled by a reactance tube member;

Figure 4*b* illustrates the basic modifications of the equipment at the second station of the system disclosed in Figure 4*a*; and Figure 5 is a circuit diagram of a directional comparison relay scheme including the novel frequency inversion arrangement of the invention, separate transmitters being used for relaying and non-relaying uses.

*General description*

The basic concepts of frequency inversion are more clearly brought out by a general consideration of the frequency inversion scheme as applied to well known carrier systems, and accordingly Figure 1 discloses in block form a carrier relaying system including the frequency inversion arrangement of the invention.

With reference to Figure 1, there is illustrated thereat a protective line section C connected between a pair of power supply busses X and Y and terminated at its ends by station A and station B respectively. A pair of circuit breaker units 1 and 2 connect the protected section to the supply busses and control equipment at the associated stations A and B are arranged to control the circuit breaker units in their connection and disconnection of the protected section thereto as various types of line faults occur.

The station current relaying systems in Figure 1 are shown as generally comprising current transformer sets 3 and 4 arranged to operatively control relay control systems 5 and 6 upon detection of predetermined fault conditions on the protected line section C. The relay control systems 5 and 6 are, in turn, operative to control associated convertible transmitters 7 and 8 respectively. Miscellaneous service units, shown at 5*a* and 6*a*, are also operative (subject to non-operation of control systems 5 or 6) to control the associated convertible transmitters 7 and 8.

Specifically, at station A operation of miscellaneous service equipment 5*a* will cause transmitter 7 to transmit the assigned miscellaneous service frequency $f1$ and operation of the relay control equipment 5 controls the convertible transmitter 7 to transmit relay frequency $f2$. At station B the frequency assignments are of the opposite order so that the convertible transmitter 8, when energized by miscellaneous control equipment 6a, transmits miscellaneous service frequency $f2$ and when energized by relay control equipment 6, will transmit relay frequency $f1$.

For purposes of illustration the special (non-relaying) service provided between the stations in the present embodiment is set forth as comprising a voice communication linkage. The miscellaneous service frequency will therefore be alternatively referred to as the voice frequency hereinafter. The relay carrier frequency will be called the relay frequency.

Each station also comprises two receiver units 9, 10 and 11, 12 which are arranged to respond to the receipt of the predetermined assigned frequencies. In the present embodiment carrier relay receiver 9 at station A is tuned to relay frequency $f1$ and miscellaneous service receiver 10 is tuned to miscellaneous service frequency $f2$, these being the frequencies transmitted by station B. Carrier relay receiver 9 is operated whenever frequency $f1$ is on the protected line and controls relay control equipment 5 to trip or maintain associate circuit breaker 1 in the closed position in accordance with the nature of the received frequency $f1$ signal. Miscellaneous service receiver 10 at the station A is adapted to respond to frequency $f2$ and, being a communication linkage, conventional hand-set equipment is shown as being energized by the received voice modulated signals.

The miscellaneous service receiver 12 at station B is arranged to respond to miscellaneous service frequency $f1$ when transmitted by station A and is arranged to extend the received voice modulated signals to associated handset equipment. The relay receiver 11 at station B is arranged to respond to frequency $f2$ when transmitted by station A to control the associated circuit breaker unit 2 to trip or hold with detection of a fault condition in accordance with the nature of the received signals.

The transmitter at each station may be continually energized whereby station A normally applies frequency $f1$ to the line and station B normally applies frequency $f2$ to the line, or they may be arranged to be energized only when the stations decide to communicate with each other. In either case the duplex frequencies $f1$ and $f2$ are normally used in the assigned manner to provide a two way communication channel between the stations for use by the attendants in providing reliable power line supervision.

In the event of the occurrence of a fault at any time it is, of course, important that the carrier relaying equipment be operated, and that the miscellaneous service be interrupted to prevent interference thereof with the more important carrier relaying functions. According to the invention, therefore, with the detection of the fault condition by the equipment at the stations A and B, the frequency transmissions of the respective transmitters thereat are inverted. That is, convertible transmitter 7 at station A, with the occurrence of a fault, will terminate transmission of its assigned voice frequency $f1$ and will now transmit the assigned relaying frequency $f2$. The convertible transmitter 8 at station B in turn terminates transmission of its assigned voice frequency $f2$ and will now transmit the assigned relaying frequency $f1$ (see Figure 1).

The relay receiver equipment 9 at station A being tuned to frequency $f1$ as transmitted by station B will respond to such frequency and relay receiver equipment 11 at station B being tuned to frequency $f2$ will respond to such frequency. The relay control equipment is connected to the power line in conventional manner and the receivers effect operation thereof in accordance with the nature of the received signals to effect trip or no trip of the circuit breakers 1 and 2. As the fault detection terminates, the equipment restores to its normal condition whereby miscellaneous service may be effected once more.

Thus through the use of frequency inversion upon fault detection, a distinct and clear line of division between miscellaneous service frequency and relay frequency is effected.

Normally any fault severe enough to trip either station is severe enough to cause both stations to respond to the fault and thus accomplish the described frequency inversion and the proper carrier relay control. If only one terminal, for example, terminal A, detects the presence of a fault, it alone will cause its associated transmitter to switch or invert its frequency transmission. Accordingly station A transmits its assigned relay carrier frequency ($f2$) to station B, whereas station B will transmit its assigned miscellaneous service (voice) frequency $f2$ to station A. As will become more apparent hereinafter, station A will trip if the fault is sufficiently severe. This is an important feature of the invention for control and protection is thus effected at station A even though there is no fault current detection at station B. As previously pointed out, systems known heretofore having both miscellaneous services and carrier may generally prevent the circuit breaker at station A from tripping.

The carrier system shown in block in Figure 2 is somewhat similar to the embodiment shown in Figure 1 and is accordingly labeled with similar identification numerals. In the second embodiment, dual transmitters are used at each station in lieu of the single convertible transmitters used in Figure 1. For purposes of illustration of the details of the respective arrangements the directional comparison system in Figure 5 is shown as having dual transmitters at each station and the phase comparison system of Figures 3 and 4 are shown as having the single convertible transmitter.

It is apparent that the carrier system having the separate transmitters 7a, 7b, 8a, 8b have a slightly modified relay control system in which the transmitters are controlled over two separate control paths. The paths are interconnected so that as the relay control path becomes effective to energize the relay carrier transmitter such as 7b or 8b at a station, it is also effective to terminate the energization of the miscellaneous frequency transmitter, such as 7a or 8a to prevent such frequency from providing a restraining influence. Further advantages of the respective systems will become apparent with disclosure of the details of the system operations.

It is seen from the foregoing that by use of the frequency inversion arrangement in a carrier relaying system, miscellaneous service may be safely, economically and reliably included in a carrier relaying system without disturbance or interruption of the more important carrier relaying functions. Additionally a more positive type of line protection is accomplished with even the most undesirable types of line faults.

*Frequency inversion as used with a phase comparison relaying system*

Further specific advantages of the frequency inversion principle are best brought out by a consideration of the specific application of such arrangement to the more important types of known relaying systems.

With reference now to Figures 3a and 3b there is shown therein a phase comparison relaying system including miscellaneous services as provided by frequency inversion equipment. For purposes of clarity, the allocation of frequencies f1 and f2 for the relaying and miscellaneous service uses is similar to that set forth in the schematic block disclosure of Figures 1 and 2; that is, station A transmits f2 for relaying purposes and f1 for voice purposes and station B transmits frequency f1 for relaying purposes and frequency f2 for voice purposes. Stations A and B at each end of the protected section are somewhat similar in nature and accordingly only station A has been shown in detail in Figure 3a. Figure 3b is illustrative of the particular portion of the circuit at station B which differs from station A. For purposes of association, the corresponding elements of Figure 1 and Figure 3 have been assigned like numerals.

Specifically, station A in Figure 3a includes a conventional circuit breaker 1 for connecting the one end of the protected section to power bus X. Line current equipment 3 is connected to the protected line and on detection of a fault forwards a signal over an amplifier 25 to a fault detection circuit 26 and to a convertible transmitter 7. The convertible transmitter 7 is normally arranged to transmit frequency f1 (modulated by voice means 5a) when that equipment is energized by the local attendant, and to transmit frequency f2 whenever a fault is detected and the proper signal is received from the relay control stage 5. The output of the transmitter, in either case, is coupled to the carrier conductor of the power line by coupling network 14.

Voice receiver 10 at station A tuned to frequency f2 is arranged to receive voice modulated signals as transmitted at that frequency by station B and extends them to the local handset equipment. Relay receiver 9 is tuned to frequency f1 and upon receipt of such signals from station B detects or rectifies them and tenders same to a comparer circuit 27 of the relay control circuit 5. The comparer circuit 27 compares the amplified line current output which is registered through the fault detection equipment, with the signal received from the distant station B and effects tripping or restraining of the local circuit breaker 1 by controlling the energization and deenergization of the associated circuit breaker trip coil 20. A double wave trap 17 is connected to the incoming end of the protected section to isolate the carrier to the desired section.

The relay control circuit 5 consists basically of a series of current transformers indicated at 3a, 3b and 3c which are connected to phases A, B and C of the protected power line section, to control three over-current fault detector relays 21, 22 and 23 in a well-known manner. The response network 24 is of the conventional type having an output which is proportion to $I_2+KI_0$. That is, generally speaking, in the presence of positive (that is, normally balanced $I_1$) sequence components of line current, the output of the network is zero. However, as the three phase line currents become unbalanced, or become abnormally heavy, the network will provide a signal output which will vary with the input.

The output side of the response network is connected to a control circuit which is arranged to be energized over incoming conductors 38 and 39 which extend to a D. C. power supply which may be a 120 v. D. C. supply. An amplifier unit 25 including a pair of conventional amplifier tubes 30 and 31 arranged in push-pull relation are connected to the output side of response network 24 to amplify the signal output thereof. The tubes respectively comprise plates 32 and 35, control grids 33 and 36, and cathodes 34 and 37. The control grids 33 and 36 are coupled to the output of the response network through the secondary of an output transformer unit 29; the plates 32 and 35 are connected to the positive supply conductor 38 over plate load resistances comprising segments 40 and 41 of the primary of a transformer 42; and the cathodes 34 and 37 are connected via cathode resistor 46 to the negative conductor 39.

Since, under normal conditions, the response network has no current output, the amplifier tubes 30 and 31 will be normally inoperative to extend an operating signal to the control circuit. However, upon the occurrence of an unbalance in the transmission line (or an unusually high balanced current) the response network has an output of power line frequency which is applied to the control grids 33 and 36 of the amplifier tubes 30 and 31. Such signal is amplified by the tubes in a conventional push-pull operation, and appears across the secondary of the transformer 42 as a sine wave output which effects interruption of the transmission of the miscellaneous service signal (frequency f1 by station A) and the transmission of relay control carrier (frequency f2) over the power line, such operation being more fully described hereinafter.

The secondary winding of the transformer 42 is divided into two sections 43 and 44 respectively, the first section 43 being coupled to the oscillator 69 of the convertible transmitter 7 and to a phase comparer circuit 27 through a fault detector circuit 26. The second section 44 is directly coupled to control the fault detector circuit 26.

The comparer circuit comprises a comparer tube 48 and a trip relay 47 arranged to be connected across the power supply conductors 38 and 39 in series circuit. The comparer tube comprises a plate 49, a screen grid 50, a control grid 51 and a cathode 52. The plate 49 is connected over trip relay 47 to the positive conductor 38 (the relay doubling as a plate load resistor), and the cathode 52 is connected to an adjustable cathode resistance 53 which is connected between the negative conductor 39 and positive conductor 38. The screen grid 49 is arranged to be connected to the first section 43 of the secondary winding of transformer 42 by contacts 55a (normally open) of a fault detector relay 55. The control grid 51 is connected to receiver unit 9 by a pair of conductors 56 and 57, the receiver being arranged to accept the incoming relay carrier frequency (f1) as transmitted by station B and to apply such frequency to the comparer tube 48 for comparison purposes. It is apparent therefrom that the comparer circuit 27 is controlled by signals from the local response network 24 (screen grid 50) and the distant station B (control grid 51). The receiver will of course also accept frequency *f1* as transmitted by station A for miscellaneous service purposes, but since the output thereof on conductor 56 is a negative signal, the comparer tube 48 is nonresponsive thereto.

Trip relay 47 is arranged to operate with energizing of the plate of the comparer tube 48 and is operative at its contacts 47*a* (normally open) to control connection of the trip coil 20 of circuit breaker 1 to the energy supply conductors 38 and 39.

The fault detector circuit 26 is connected to the second section of the secondary winding of transformer 42 by a full wave rectifier circuit 45, the fault detector circuit 26 comprising a fault detector relay 55 and a fault detector tube 59 connected in series relation across the power supply source. The detector tube may be of the type conventionally marketed as a 6V6 by RCA and other companies, which has a plate 60, control grid 61 and a cathode 62. Plate 60 is connected over a fault detector relay 55 (which acts as a plate load resistance) to the positive conductor 38, and the cathode is connected to an adjustable resistance 54 which is connected between negative conductor 39 and positive conductor 38. The control grid 61 is connected over a grid resistance 63 and the rectifier arrangement 45 to the secondary transformer section 44. With receipt of a signal of a given strength, the fault detector tube is rendered conductive and the fault detection relay 55 is energized to close contacts 55*a* to thereby prepare a circuit for the comparer tube 48. This relay also removes the voice modulation by opening contacts 55*b*, and shifts the transmitted frequency as hereinafter described.

The transformer section 43 is also connected to an oscillator tube 69 of transmitter circuit 7 over conductor 67, resistance 67'.

The oscillator tube 69 comprises a plate 70, screen grid 71, a control grid 72, and cathode 73. Plate or anode 70 and screen grid 71 are normally connected to negative potential over choke 74', resistance 67', conductor 67, the secondary of transformer 42 and conductor 46' to negative potential on conductor 39. Since the cathode 73 is also connected to conductor 39, the oscillator tube is normally maintained in an inoperative status, unless being used for an auxiliary service.

Control grid 72 is connected to negative conductor 39 by grid leak resistor 86 and capacitor 85, and is coupled to the plate 70 by an oscillating tank circuit 75 which determines the frequency of oscillation of the oscillator arrangement.

The LC constant of tank circuit 75 at station A is normally determined by a pair of capacitors 84 and 85 and an inductance member 81. A second inductance member 83 is normally shunted by the closed contacts 55*c* of the fault detector relay 55. Thus, the oscillator output with application of positive potential by the miscellaneous service device 5*a* over normally closed contacts 55*b* and resistance 74 is determined by the value of inductance 81 and the capacitors 84 and 85 (which, at station A, is frequency *f1*). With detection of a fault and operation of the fault detector relay 55, contacts 55*b* are opened to interrupt the oscillator control circuit extending to the miscellaneous service device 5*a* and contacts 55*c* are opened to insert inductance 83 into the LC network and thereby change the output of the oscillator circuit to a lower frequency, (frequency *f2* at station A in the present example).

The oscillator circuit output is applied to a conventional push-pull amplifier circuit 68 (shown in block form) over capacitors 87 and 88. The output side of amplifier 68 is connected to the line conductor over an inductance capacitance coupling circuit 14 comprising a coupling transformer 89, inductance 90 and capacitor network 91.

The coupling transformer 89 also serves to couple the local receivers 9 and 10 to the power line. A wave trap 17 impedes passage of carrier toward the local circuit breaker side of the equipment.

Station B is of similar arrangement, in conventional manner, the response networks 24 of station B being connected in an oppositely (i. e. differentially) poled manner, that is, the sine wave outputs appearing across transformer 42 at the respective stations on a fault current which flows past the stations in the same direction will be 180° out of phase. Additionally, the tank circuit 75*b* (Figure 3*b*) for the oscillator at station B includes a capacitor 83*b* in lieu of the inductance 83 which was included at station A. Thus the normal output of the oscillator at station B is frequency *f2* and as contacts 55*c* are opened the added value of capacitance 83*b* to the tank circuit will raise the frequency output to frequency *f1*. It is apparent that the respective stations A and B could be the same as set forth in Figure 3*a*, with one station having contacts 55*c* normally open and the other station having them normally closed. The disclosed arrangement, however, is considered extremely advantageous in that it is informative of any disruptions which may occur at these contacts.

*Operation station equipment for miscellaneous use*

The operation of conventional phase comparison systems, such as set forth herein, is well known in the art and accordingly is only briefly considered at this point, the following description being concerned principally with the disclosure of the frequency inversion principle.

With the equipment in its normal standby condition, response network 24 at each station will, generally speaking, have a zero output. Response network amplifier 25, fault detector circuit 26, comparer circuit 27, and convertible transmitters 7 and 8 will therefore be in the standby condition. The oscillator tank circuit 75 at station A will include inductance 81 and capacitors 84 and 85 and the oscillator is prepared to transmit frequency *f1* which is the assigned miscellaneous service frequency.

The oscillator tank circuit 75 at station B includes inductance 81*b*, capacitor 84*b* and 85*b* and the oscillator thereat on energization will transmit a frequency *f2* which is the assigned miscellaneous frequency therefor.

In the event that the party at station A desires to effect communication with the distant station B, miscellaneous service means 5*a* are operated to effect the application of positive potential over normally closed contacts 55*b* and resistance 74 to the plate 70 and screen grid 71 of the oscillator tube 69. The oscillator tube 69 is accordingly rendered conductive and oscillates in the fashion of the conventional type shunt fed Colpitts oscillator at a frequency *f1* as determined by the tank circuit 75.

The output of the oscillator is applied to the amplifier 68 over capacitors 87 and 88 for amplification and application over the coupling network 14 to the power line conductor. Miscellaneous service transmitter 5a, when used for communication purposes, will include voice equipment for modulating the transmitted frequency with voice currents. At station B the modulated frequency f1 is accepted by the miscellaneous service receiver 12 thereat and tendered to the receiver portion of the handset. Miscellaneous service unit 6a at station B is operative to effect application of voice modulated frequency f2 (as determined by tank circuit 75b, Figure 3b) to the power line. Two way communication over individual paths may be thus normally effected over the carrier line by the attendants at the several stations.

With the occurrence of an external line fault while the equipment is in such condition (or while it is in its normal standby condition), a current unbalance (or a balanced current high enough to cause over-current relays 21, 22 and 23 to operate) will effect the registration of one or more of the phase sequence currents on the output side of the response network 24. The output current is thereupon amplified by the push-pull amplifier arrangement 25 and applied to the primary of transformer 40, a corresponding sine wave being established in known manner on the transformer secondary 42.

The output current is applied over the second section 44 of the secondary winding of transformer 42 to a full wave rectifier network 45. It is apparent that a signal wave of sufficient strength to overcome the normal bias of tube 59 is applied to the rectifier network 45 and grid resistance 63.

The fault detector tube 59 will be rendered conductive and an operating circuit is completed for the fault detector relay 55, the circuit extending from positive battery on conductor 38 over the winding of relay 55, the conductive fault-detector tube 59, and resistance 54 to negative battery on conductor 39.

As the fault detector relay 55 operates, it is effective at its contacts 55a to connect the output of the response network amplifier 25 to the screen grid 50 of the comparer tube 48, at its contacts 55b is effective to open the control circuit extending between the miscellaneous service equipment 5a and the oscillator tube 69 (to thereby terminate and prevent energization of the transmitter for non-relaying purposes during the more important relaying function), and at its contacts 55c opens the shunt circuit for inductance 83 to effect the inclusion thereof in series with inductance 81. The LC constants of the tank circuit 75 for oscillator 69 are then changed and the oscillator is now prepared to transmit a frequency f2 over the carrier circuit instead of the frequency f1 which was transmitted when the tank 25 was in its normal condition.

The oscillator circuit at station A is operatively energized as the positive half cycle of each sine wave appears on the secondary portion 43b of center tapped transformer 42 and is extended over conductor 67, resistance 67' to the plate and grid of oscillator tube 69. During this period a negative bias appears across section 43a and screen grid 50 of comparer tube 48 is negatively biased. As the negative portion of the wave appears on section 43b the oscillator is turned off and screen grid 50 is rendered positive. Thus, an intermittent signal of frequency f2 is applied to the line by station A as a fault is detected, and positive and negative potential are alternatively applied to said grid 50.

The equipment at station B is similarly operative, the contacts 55c of the fault detector relay thereat being opened with detection of the fault to effect the inclusion of the capacitor 83b in series relation with capacitors 84b and 85b and inductance 81b, whereby the LC characteristics of tank circuit 75 are changed and frequency f1 is intermittently applied to the line.

The stations are oppositely, that is, differentially, "poled" in their connections and therefore with the appearance of an external fault on the power line (wherein the flow of current past both stations is in the same direction), the sine waves appearing on the secondary sections 43a and 43b of the transformer 42 at one station will be 180° out of phase with respect to those at the other station. Since the oscillators at each station operate only during the positive portion of the sine wave on section 43b, and since on external faults they are out of phase 180°, the transmitters at each station will be alternately energized, the oscillator at station A will transmit relaying frequency f2 while the oscillator at station B is "off" and the oscillator at station B will transmit frequency f1 for the half cycle that the oscillator at station A is "off." Such alternate operation continues for the duration of the fault detection.

Referring now to the equipment at station A disclosed in Figure 3a, it is apparent that the incoming signal frequency f1 is received by relay receiver 9 and applied over conductors 56 and 57 to the control grid of comparer tube 48, the applied signal being of a negative potential. Since such signal is transmitted by sation B as the positive portion of the sine wave appears on section 43b of the transformer 42 thereat, the local sine wave output on section 43b will be negative and the local oscillator will be off. During this period the sine wave output of the upper section 43a of center tapped transformer is positive and the screen grid 50 is so biased. Since the tube is negatively biased by the received carrier signal at this time, the comparer tube circuit will not conduct and the circuit breaker is restrained from tripping. The comparer tube at station B is similarly prevented from conducting with receipt of the restraining relay frequency f2 from station A.

It is seen from the foregoing that with detection of a fault the miscellaneous service frequency transmissions of the stations are terminated and the relay frequencies are transmitted; also that in the event the fault is external to the protected section tripping of the circuit breakers is prevented. In the event that the fault is internal (as for example, a fault at point F in Figure 1), it is apparent that the fault current flow will be toward that point and will accordingly flow through the line terminals in opposite directions. The output sine waves of sections 43b of the transformers 42 will therefore be in phase and the restraining portion of the received signal from station B is applied to the control grid 51 of the comparer tube as the negative portion of the local signal is applied to the screen grid 50 of the comparer tube. During the application of the positive potential to the screen grid 50 during the next half cycle, no signal is received from station B and the tube becomes conductive.

With the operation of the comparer tube 48, an operating circuit is completed for the trip relay 47, the circuit extending from positive battery on conductor 38 over the winding of trip relay 47, comparer tube 48 and resistance 53 to negative battery on conductor 39. The trip relay 47 operates and at its contacts 47a completes an operating circuit for the circuit breaker trip coil 20, the circuit extending from positive battery and conductor 38 over the closed contacts 47a, the trip coil 20, and contacts 1a on the circuit breaker 1 to negative battery on conductor 39. It is noted that the operating circuit passes over the auxiliary contacts 1a of the circuit breaker 1 so that the circuit for the trip coil of the circuit breaker will be opened with the tripping of the circuit breaker 1. Trip coil 20 is operative to effect the automatic tripping of circuit breaker 1 in the conventional manner.

As the fault is cleared, the fault detector relay 55 resets and non-relay usages may be continued whether the line has been deenergized at its power frequency or not.

It is pointed out that although relay receiver 9 picks up its own frequency $f1$ as transmitted by station A for miscellaneous service use, during normal usage, no operative function will occur. Screen grid 50 of the comparer tube is disconnected from a supply source and accordingly the tube cannot be rendered conductive thereby. The signal applied over conductors 56 and 57 as frequency $f1$ is received by relay receiver 9 is of a negative potential and when applied to the grid 51 of the comparer tube 48 operation thereof is prevented. Similarly, the comparer tube 48 at station B is biased to cut off whenever it is transmitting voice frequency $f2$ to station A.

The foregoing conditions are of course based on conditions in which the fault currents have definite in phase and out of phase relations. Since the operation of the equipment responsive to other types of faults is well known and does not pertain to the scope of the invention, further discussion thereof is not believed necessary.

It is seen that for external faults and for internal faults which draw fault current at both line terminals, both ends shift to the relaying frequency. However, if one of the stations does not detect the fault current of an internal fault, it will not shift and the non-relaying signals may still be transmitted. For example, if a fault occurs which station A detects and station B does not, both stations will transmit frequency $f2$ (B transmitting such frequency as its assigned voice frequency and station A transmitting it as its assigned relay frequency).

Since station A does not now receive a restraining frequency from station B the equipment thereat effects the tripping of the local circuit breaker, such manner of control being unattainable in previous systems of protective relaying with joint usage. In as much as station B does not detect fault current, the equipment thereat will not be prepared for tripping. It is apparent therefrom that there is no danger of overlapping of functions or interference with the relaying equipment by the miscellaneous services, and that the safe inclusion thereof in a carrier relaying system of the phase comparison type is now possible.

*Frequency inversion as used in phase comparison relaying system having reactance control*

The frequency inversion may also be accomplished in a phase comparison system through the use of a reactance tube control circuit. Basically, a reactance tube and its circuit characteristic determining elements are connected in shunt of the transmitter oscillator tube and its associated tank circuit. The circuit determining elements associated with the reactance tube are connected so as to be controlled by the contacts of the fault detector relay as to their inclusion or non-inclusion in the reactance tube circuit, and with operation and restoration of the fault detector relay the transmitter accordingly shifts frequencies.

Specifically, a given number of elements are connected in circuit with the reactance tube when the equipment is in its normal condition. However, with the detection of a fault, the fault detector relay will operate and at its contacts will effect the removal of certain elements from the circuit. With removal of these elements, the value of the reactance which is connected in shunt across the oscillator is thereby varied and the frequency of operation of such unit is accordingly changed.

In the present embodiment station A is shown as normally being adapted to transmit frequency $f1$ for accomplishing miscellaneous services and is shifted to relaying frequency $f2$ by the reactance control circuit upon detection of a fault. Station B will, of course, be operated in the reverse fashion. That is, it will normally transmit frequency $f2$ for miscellaneous service condition uses and will be inverted to transmit frequency $f1$ by the reactance control circuit in the event that a relaying function is to be performed.

If both terminals shift frequencies, phase comparison relaying takes place as in the conventional phase comparison scheme. If one terminal has no fault current supply on an internal fault, that station will not shift frequencies. A terminal which does not shift frequencies does not restrain the remote terminal from tripping, however, even though the miscellaneous service is in use, and accordingly that remote terminal will be allowed to trip. As previously pointed out, this is considered to be a desirable advancement in the provision of a more positive acting system of this type.

The inclusion of a frequency inversion arrangement in a phase comparison relaying system as controlled by a reactance circuit is set forth in Figure 4 and the operation of such arrangement will now be briefly considered.

With reference to Figure 4a, there is shown thereat station A of a phase comparison relaying system which is operatively familiar to that of the arrangement in Figure 3. The station is similar to station A of Figure 1 and is connected to one end of a protected power line section C. Station B is similar in most respects to the arrangement shown in Figure 4a and basically differs only in the manner shown in Figure 4b.

A conventional circuit breaker 101 is shown connected at the one end of the protected line section, a similar circuit breaker being located at the other end of the protected section at station B. A conventional double-tuned trap 102 is connected between the circuit breaker and the equipment at each of the stations. A series of line current transformers 203 are connected to each phase of the power line system and supply a phase sequence filter response network 204 with indicative phase currents. The sequence filter is commonly arranged to provide an output of all three of the phase sequence components wherever such components are present at the filter input. The filter has an output (positive phase sequence) when the three phase line currents are in balanced relation.

The output circuit of the sequence filter 204 is connected over a rectifier network 205 to the windings of fault detector relays 206 and 207. The sequence filter output 204 is also connected over conductors 208, 209 to the primary of the coupling transformer 210. The secondary winding of transformer 210 comprises sections 211 and 212 which are connected respectively to control a pair of trigger tubes 213 and 215. Trigger tubes 213 and 215 are grid controlled gaseous tubes which may comprise respectively plates 217, 221, screen grids 218, 222, control grid 219, 223 and cathods 220 and 224. The plates 217 and 221 are connected respectively over resistances 225b and 226 and the combination in series with resistance 225a to a positive battery supply source on conductor 227.

The normally closed contacts 206a on fault detector relay 206 normally by-pass the trigger tubes and hold them inoperative by connecting the junctions of the three plate circuit resistors 225a, 226, and 225b to the negative conductor 228, during the time the miscellaneous services are in use.

The cathode 220 for the first trigger tube 213 is connected over resistance network 229, 230 to a negative supply source on conductor 228, and cathode 224 of the second trigger tube 215 is connected over resistance network 231, 232 to negative battery on conductor 228. The grids 218, 219 and 222, 223 of the respective trigger tubes are connected to the secondary sections 211 and 212 of the transformer 210 for control thereby. The grids of trigger tubes 213 and 215 are also connected to bias resistances 230 and 232. Trigger tubes 213 and 215 are normally prevented from firing by the connection of negative potential through contacts 206a to conductor 228. When relay action is to occur the sensitive fault detector relay 206 opens contacts 206a to remove the by-pass on the trigger tubes 213 and 215.

A reactance unit 238 and associated circuit determining elements are connected across positive conductor 227 and negative conductor 228 by the normally closed contacts 206d and 206b of sensitive fault detector relay 206. The reactance tube comprises a plate 239, screen grid 240, control grid 241 and cathode 242, the plate being connected over a choke coil 247, resistance 247a and contacts 206d of the fault detector relay 206 to the positive potential conductor 227. Screen grid 240 is also connected to the positive potential source over the normally closed contacts 206d of the fault detector relay 206 and is normally positively biased. Control grid 241 is connected to negative conductor 228 over resistance 244. Cathode 242 is connected to conductor 228 by resistance 246 in series with the RC network comprising resistance 281 and capacitor 285. In parallel with this arrangement is a set of normally closed contacts 206b on the fault detector relay 206 so arranged as to normally connect resistance 245 in the cathode circuit for the reactance tube.

The fault detector relay contacts 206d also supply positive battery to normally energize an oscillator tube 250. The oscillator tube 250 comprises a plate or anode 251, screen 252, control grid 253 and cathode 254. Screen grid 252 and plate 251 are normally connected to positive battery over contacts 206d of the fault detector relay and the oscillator is therefore normally energized as is frequently required when a multiplicity of miscellaneous services are used.

Oscillator tube 250 is controlled to operate at a predetermined frequency which is determined by the value of the components of an interconnecting LC network 261 and the value of the reactance which is inserted in parallel thereof by reactance tube 238 in its normal energized condition. The output side of the oscillator is coupled to a conventional power amplifier unit 262 which is in turn connected over a transformer 263 to a coupling capacitor 264 to the conductor of the power line. Voice modulating equipment 260 is connected by an associated network 260a, b, c to the output side of the oscillator and is arranged to impress voice modulations upon the normally generated output thereof.

A set of contacts 206c of fault detector relay 206 are connected in shunt of a portion of the modulating network 260a, b whereby, with operation of the fault detector relay, contacts 206c are closed to shunt out the modulating source and to prevent the interference thereof with the more important relaying function of the equipment. Contacts 206b are simultaneously operated at station A to remove resistance 245 from the cathode circuit of reactance tube 238 and to change the value of reactance controlling the oscillator tube 250. In the present embodiment the oscillator output is raised to frequency $f2$ (the relaying frequency) with opening of the contacts.

The coupling network comprising capacitor 264 and transformer 263 also connects the carrier conductor of the power line to receiver units 266 and 267, the receiver 267 being tuned to respond to the miscellaneous service frequency $f2$ as transmitted by station B and the receiver 266 being tuned to respond to the relaying frequency as transmitted by station B. At station B nonrelaying receiver 267 would be tuned to frequency $f1$ and the relay receiver 266 would be tuned to frequency $f2$.

The output of the relaying frequency receiver 266 is connected over conductor 207 to a half wave voltage doubler circuit 268. The voltage doubler circuit 268 is conventional in nature and comprises a half wave rectifier 280 and associate network 269a including a capacitor 277 and resistance 275. The arrangement provides a voltage output which is somewhat less than twice the input peak voltage, the alternate conductivity of the separate sections of the two section rectifier 280 effecting the addition of the charge impressed on capacitor 277 during the first half cycle to the input voltage being applied to capacitor 283 (in the output circuit thereof) during the second half cycle.

The RC network comprising resistance 282 and capacitor 283 is connected in turn to the grid of a relay tube 269. Thus, as the capacitor 283 discharges into the load resistance 282 with the conductivity of the upper diode section, a corresponding biasing voltage is impressed on the control grid of the comparer tube.

The RC network 269a is also connected over conductor 284 to the cathode circuit of trigger tube 215 and signals received over this conductor are applied with the signals obtained from the voltage doubler circuit to control the relay tube 269.

Relay tube 269 comprises a plate 270, screen grid 271, control grid 272 and cathode 273, the control grid 272 being connected to the voltage doubler circuit 268 and trigger tube as described above. The cathode 273 is connected to conductor 228 over the network comprising resistor 281 and capacitor 285, and the plate 270 is arranged to be connected to positive potential on conductor 227 in series with a trip relay 276 by the normally open contacts 207a of fault detector relay 207. Trip relay 276 at its contacts 276a controls the energization of a trip coil 101a which in turn effects tripping of the local circuit breaker 101.

*Frequency inversion by reactance tube control*

The operation of a phase comparison equipment is generally similar to that set forth heretofore, that is, each of the two stations are poled 180° out of phase in their connection to the protected section. With the occurrence of an external fault, fault current will flow past both of the stations A and B in the same direction, and accordingly, the output of the sequence filters 204, as it appears across the transformer 210 at station A, will be 180° out of phase with the output at transformer 210 at station B. With the occurrence of an internal fault the potential impressed across the transformers 210 at the respective stations will be in phase. Under normal conditions the transmitter at station A applies the miscellaneous service frequency *f*1 to the line, this frequency output being determined by the LC constants of the network 261 and the reactance unit 238. The output of the oscillator is applied to a power amplifier 262 and thence over the coupling networks 263 and 264 to the carrier conductor. Use of the miscellaneous service communication link requires speaking into the handset H by the attendant, or the application of other modulations such as audio tones. The modulating source 260 is operative over its associated networks 260*a*, *b*, *c* to modulate the outgoing carrier in conventional manner. Similarly, at station B the equipment is normally operative to transmit modulated frequency *f*2 over the carrier conductor to station A.

Such frequency signals are received at station A over the coupling network 264 and applied to the input side of the non-relay receiver 267 which is tuned to the assigned miscellaneous service frequency *f*2. The receiver accepts the incoming signals and applies same to the miscellaneous service which in the illustrated embodiment comprises a handset for voice communication purposes. At station B the miscellaneous service receiver 267 is tuned to frequency *f*1 and accepts the signals from station A in like manner.

It is apparent that the miscellaneous service frequency (frequency *f*1) as transmitted by station A will also be applied to its local relay receiver 266 which is tuned to *f*1. Such signal will be extended over conductor 207′ to the rectifier 268 and applied to the control grid of the relay control tube 269, but being a negative signal will not render the tube conductive.

It is seen therefore that the intertransmission of frequency 1 and frequency 2 by the stations A and B respectively may be used to accomplish miscellaneous services other than the important relaying functions.

Assuming now the occurrence of an external fault, the fault current will flow past each of the stations in a similar direction and accordingly the output of the sequence filters 204 as applied to transformers 210 at each of the stations will be a sine wave which is 180° out of phase relative to the other station. With detection of the fault currents, sequence filters 204 will also effect the operation of the fault detector relays 206 and 207 (if the fault is of sufficient strength) and will effect the application of positive operating potential to the control grids of the trigger tubes 213 and 215.

Fault detector 206 operates and at its contacts 206*d* interrupts the energizing circuit for the oscillator tube 261 and the reactance tube 238, and by opening contacts 206*a* removes the positive biasing potential from the cathode of the trigger tube 213 allowing it to fire in polarized pulses corresponding to half cycles of the sequence filter output. With occurrence of each half cycle pulse, the plate 251 of the oscillator 250 is rendered positive and the oscillator is rendered conductive.

As the fault current is detected and the fault detector relay 206 is operated, it is effective at its contacts 206*b* to open a point in the cathode circuit of reactance tube 238 to thereby remove resistance 245 from the cathode circuit. Accordingly, the value of resistance in the cathode circuit of the reactance tube is varied to cause a corresponding variation of the reactance value of the tube and a corresponding variation in the resonant frequency of the tank and the oscillation frequency of the tube 250. In the present embodiment, the new frequency output will be the assigned relaying frequency *f*2.

Thus, with the detection of a fault, the reactance tube carries the frequency rate of the oscillator to the relaying frequency *f*2 and such frequency is transmitted by station A for alternate half cycles of the power line frequency.

A similar inversion of frequency transmission occurs at station B, alternate half cycle pulses of relaying frequency *f*1 being transmitted to station A. With reference to Figure 4*b*, it is noted that the contacts 206*b*′ are normally open. Thus, the transmitter normally transmits frequency *f*2. With detection of a fault, contacts 206*b*′ are closed to include resistance 245*b* in the cathode circuit and station B now transmits relaying frequency *f*1.

Referring now to Figure 4*a*, station A receiver 266 being tuned to frequency *f*1 receives the relaying signal frequency from station B and applies same over its output circuit to the conductor 207′ and the voltage doubler circuit tube 268. The signal is rectified and strengthened thereby and appears at the output side of the voltage doubler as a half cycle negative wave which is intermittently applied over the RC circuit 269*a* to the grid 272 of the control tube 269.

Referring now to the trigger tube 215 at station A, it is apparent that as the fault current is locally applied over the transformer 210 and the secondary section 212 thereof to the trigger tube 215, the control grids 222 and 223 of the trigger tube 215, the tube will be rendered conductive. Unidirectional half cycle pulses at line frequency will appear across the tube and will be applied over conductor 284 to the RC network 269*a*.

As previously pointed out, whenever the fault is external, the output of the transformers 210 at the respective stations will be 180° out of phase with each other. Accordingly, during the period that the trigger tube 213 at station B causes its transmitter to operate, trigger tube 213 at station A turns off its transmitter. During the same period, trigger tube 215 at station B is non-conductive and trigger tube 215 at station A conducts. Accordingly, at station A as the positive half cycle pulses are applied by the trigger tube 215 to the RC network 269*a* and the grid of the relay tube 269, the transmitted pulse from station B at frequency *f*1 is received by receiver 266 and applied over the voltage doubler circuit 268 to the RC network 268a. The application of the negative bias overcomes the positive signal from trigger tube 215 and the control trube will remain non-conductive.

The operation at station B is of a similar nature, the received relaying frequency signal f2, as received from the station A, effecting restraint upon the local signal to prevent the striking of the corresponding relay tube 269 thereat.

It is apparent that, if the fault is internal, the current will flow in opposite directions at each of the stations, and the sequence filter output across the transformers 210 of the respective stations will be in phase. Accordingly, as the positive half wave signal is applied by trigger tube 215 to the control grid of relay tube 269 at station A, the trigger tube 213 at station B will be inoperative, and the station B transmitter being off, no counteracting or restraining signal from station B will be received during the effective half cycle.

Relay tube 269 will then conduct to complete an operating circuit for the trip relay 276, the circuit extending from positive conductor 227 over closed contacts 207a, the winding of trip relay 276, the now conductive relay tube 269, and resistance 281 to negative battery on conductor 228.

Trip relay 276 operates and at its contacts 276a completes an obvious operating circuit for trip coil 101a to effect the tripping of circuit breaker 101.

If the line conditions are such that the received carrier pulses (which produce the desired restraint of the tripping of the relay tube 269) do not overlap the local operating voltage sufficiently, it is apparent that the relay tube 269 will fire.

During the period of fault detection, the use of the equipment for miscellaneous services is prevented in that contacts 206c are closed and the modulation source 260 is shunted out of the circuit.

After clearance of the fault, the equipment is restored to normal by the release of fault detectors 206 and 207, and the miscellaneous services may again be used.

*Use of convertible transmitters vs. separate transmitters at the terminal station*

In the two foregoing phase comparison schemes which have been disclosed, frequency inversion has been effected by the use of single convertible transmitters at each of the stations. The single transmitters were adapted to be shifted from one frequency to the other through the action of the associated fault detector relays and the corresponding inclusion or exclusion of associate circuit elements. It is noted that two separate transmitters could have been used at each of the stations (as shown in Figure 2) to provide the two desired frequencies.

For purposes of illustration, two separate transmitters are shown in the detailed illustration of a frequency inversion system as used in a directional comparison relaying scheme, it being understood that the directional comparison system might also include convertible transmitters of the type set forth in the previous disclosure of the phase comparison schemes.

Referring now to Figure 5, station B of a directional comparison scheme is shown thereat. A circuit breaker unit 301 is arranged to connect the "B" end of the protected section to the bus Y, and includes an associated trip coil 302 which is controlled, in turn, by the directional comparison equipment at the local station. A series of current transformers 303 are connected in each of the phases of the protected line section and a series of potential transformers 304 connected to the three phases of bus Y are arranged to provide current and potential signals respectively to control a series of conventional directional relays 350, 351 and 352. The system also uses an auxiliary potential transformer 304a which responds to the voltages on the output side of the set of potential transformers 304 and controls a directional ground fault relay 353.

There are four relays shown in panels 350, 351, 352 and 353, the first three being identical except for their connection to the several different phases of the protected line section. The fourth relay responds to directional ground faults. Each of the panel relays 350, 351 and 352 includes an upper element 350a, 351a, and 352a which responds in conventional manner primarily for faults external to the protected line. Associated contacts 350c, 351c and 352c are designated carrier start contacts and are connected to control the operation of the relay carrier transmitter 309.

The second element in each of the panel relays 350, 351 and 352 forms a set of lower elements 350b, 351b and 352b which are arranged to stop the transmission of the carrier for faults on the protected lines and also for some faults at or beyond terminal A. The lower elements each control a set of d and e contacts, the former being arranged to stop any relay carrier transmission from terminal B and the latter to set up a circuit through the trip coil 302 by way of a receiver relay 310 in case no restraining carrier is received from terminal A. The lower relay elements may also be used to stop the non-relaying transmitter.

The fourth panel includes an upper element which is responsive to operate a set of "c" contacts which control starting of the carrier relaying equipment, primarily for faults external to the protected line. The panel 353 also includes a lower element "b" which operates responsive to close contacts "d" and "e" and accomplish the two functions effected with operation of the "d" and "e" contacts of the first three panel relays.

As previously pointed out, the directional comparison equipment is shown as having two separate transmitters for transmitting the two carrier frequencies, that is, a non-relaying transmitter 311 and a relay transmitter 309. The station receiving and transmitting equipment is coupled to one conductor of the power line by a coupling capacitor 314, and coupling circuits 315 and 316. Specifically, the non-relay transmitter 311 is connected over transformer 317, coupling circuit 315, and capacitor 314, and the non-relaying receiver 330 is coupled to the power line over capacitor 314, coupling circuit 316 and transformer 319. The relay transmitter 309 is connected to the power line by amplifier 327, transformer 319 and coupling network 316, and coupling capacitor 314 and the relay receiver 331 is connected to the power line over capacitor 314, coupling network 315 and tuned circuits 332 and 333'.

The miscellaneous service or non-relaying transmitter 311 comprises a conventional oscillator circuit 320 and associated tank circuit 321 having predetermined LC constants which are designed in this embodiment to provide an oscillator output of frequency f2 (station B). The oscillator is normally connected across the supply conductors 312 and 313 to be normally operative. The output side of the oscillator equipment is capacitor coupled to a conventional push-pull amplifier 323. A resistance network 322 is connected between the oscillator and amplifier circuits and a modulating network including an input source 322a (a handset and input transformer for voice purposes) is adapted to modulate the output of the oscillator tube 320 prior to amplification. The output of amplifier 323 is coupled by transformer 317, coupling circuit 315 and capacitor 314 to the carrier conductor of the power line.

The relay transmitter 309 comprises a conventional oscillator tube 325 and tank circuit 329 having predetermined LC values which are arranged with the oscillator tube to an oscillating output thereof at a frequency of f1. The cathode of the oscillator tube is normally connected to positive potential by the normally closed "c" contacts of the line relays, namely the upper elements in panels 350, 351, 352 and 353, whereby a positive bias is normally applied to the cathode of the oscillator 325 to prevent the operation thereof.

The output of the oscillator 325 is capacitor coupled to a conventional push-pull amplifier 327 for amplification. The output side of the amplifier 327 is connected over the coupling transformer 319, the coupling network 316 and capacitor 314 to the carrier conductor of the protected power line section.

An auxiliary relay 325 is connected in series with the normally closed "c" contacts of the panels and is normally energized over a circuit extending from positive battery and conduits 312, the "c" contacts of the panels, contact 326b and resistance 360 to negative battery on conductor 313.

Relay 325 at its make contacts 325a maintains closed a point in the cathode circuit for the miscellaneous service oscillator 320.

It is apparent from the foregoing that the relaying transmitter 309 is operated with detection of a fault which will open one of the panel relay "c" contacts. Simultaneously, auxiliary relay 325 will be released to open contacts 325a and interrupt transmission of the miscellaneous service carrier.

The receiving equipment at the station comprises a non-relaying receiver 330 and a relaying receiver 331. The non-relaying receiver 330 is tuned to frequency f1 and is coupled to the carrier conductor of the power line section by a coupling capacitor 314, a coupling network 316, and a transformer 319. With receipt of frequency f1 from station A the receiver 330 is operative to apply the signals to the associated voice handset.

The relaying receiver equipment 331 includes a tuned circuit 332, 333 which is connected to the incoming coupling circuit comprising capacitor 314, network 315 and transformer 317.

The receiver equipment includes a receiver tube 331 and associated receiver relay 310. The receiver relay 310 is conventional in structure and comprises two relay coils H and T. Coil T is operative to tend to move the relay to its tripping position so as to close the associated contacts and is connected to the "e" contacts of the panel relays. As previously pointed out, the "e" contacts are controlled by the lower relay elements which are of sufficient sensitivity so that at least one of them responds whenever there is a fault in, or beyond but near, the protected section in the direction for which they are polarized.

The second coil H is connected in the plate circuit of the receiver tube 331 and is effective on energization to prevent the closure of the receiver relay contacts 310a, even though the coil T may be likewise energized. The receiver relay contacts 310a control an energizing circuit for the trip coil 302 of the local circuit breaker 301.

The "d" contacts on the lower relay elements of panels 350—353 on closing complete an operating circuit for an auxiliary relay 326 which is in turn operative on energization to open its contacts 326a and 326b. These contacts 326a open a lead in the operating circuit for oscillator 320 and contacts 326b open a lead in the operating circuit at oscillator 345 respectively to terminate transmission by the non-relaying transmitter 311, and also the relaying transmitter 309.

Station A is of similar structure differing basically only in the tuning of the transmitter and receiver circuits in the manner set forth in the initial arbitrary assignments.

In normal operation the non-relaying transmitter 311 is normally energized as previously described, and voice communication between the stations may be effected by use of the hand-set in conventional manner, the associated equipment 322 and 322a being operative to modulate the output of the oscillator 320 with the impressed voice currents. The output signals are amplified by the amplifier equipment 323 and applied over transformer 317, coupling circuit 315 and capacitor 314 to the conductor of the power line.

The non-relaying transmitter at station B thus transmits frequency f2 to station A which accepts the incoming modulated signal and tenders it to a non-relaying receiver (such as 330) and the handset equipment thereat. Station A, with the use of its handset, will effect the transmission of a modulated frequency signal f1 which will be carried over the conductor of the power line to station B and extend over the coupling capacitor 314, the coupling circuit 316, transformer 319 and the non-relaying receiver 330 to the receiver portion of the handset. Thus, a two way communication link may be normally established in which separate frequencies are used for each speech path.

In the event of the detection of an external fault, while such condition is existent the miscellaneous service transmitter will be "cut off" and the relaying transmitter will be energized for such interval as the relay function requires. Specifically, for faults involving more than one conductor of the transmission line (phase to phase fault), elements on one or more of the three panel relays 350, 351, 352 will operate. Similarly for a phase to ground fault relay elements on panel 353 will be operative. The occasion and method of operation of this equipment is well known in the art and needs no further explanation hereat. With the occurrence of a fault, the effective panel relay will operate its carrier start contacts "c" to open, whereupon the positive potential which is normally supplied to the cathode 335 of the oscillator tube 340 is removed and the relay transmitter 309 is rendered active. Relay transmitter 309 now effects the application of relay signal frequency f1 to the power line to restrain the equipment at station A from tripping the circuit breaker thereat.

Simultaneously, auxiliary relay 325 is released to open contacts 325*a* and prevent further use of the miscellaneous service transmitter 311 pending fault clearance.

Similarly, at station A the equipment is operative on detection of the external fault to effect the transmission of the relay signal frequency *f2* to station B to restrain the equipment thereat from tripping the circuit breaker 301. Assuming an external fault, whereby the fault current flow past stations A and B is from right to left, the restraint at station B, for example, is accomplished as the carrier frequency *f2* is received over capacitor 314, coupling circuit 315, transformer 317 and tuned circuits 332 and 333, the received signal being thereafter applied to the receiver tube 331. The tube 331 is rendered conductive and energizes the H winding of the receiver relay 310. Since the current flow is from left to right past the stations, the fault will appear as an internal fault to station B and the lower directional element of the effective panel relay will close its contacts "*e*" to complete a circuit to the trip winding T which extends from positive battery on conductor 312 over the effective "*e*" contacts and conductor 343 to negative battery on conductor 313. However, since the hold winding H is energized by the received carrier signal from station A, the contacts 310*a* will not be closed and the circuit breaker will remain closed.

With the closure of the "*d*" contacts at station B by the effective panel relay, a circuit is also completed to auxiliary relay 326 which, at its contacts 326*a*, opens a further point in the operating circuit for the miscellaneous service transmitter 311 and at its contacts 326*b* opens a point in the operating circuit for relay transmitter 309. As a result, the restraining carrier to station A is now removed from the line. Since the current flow is from left to right at station A, the fault is recognized thereby as a true external fault. One or more of the upper contacts "*c*" are opened to start relay carrier directed toward station B, but the lower contacts "*e*" and "*d*" of the effective panel relay are not operated. Accordingly, the energizing circuit for the trip coil thereat is not prepared and no restraint is required at station A.

On an external fault in which fault current flow is from right to left, the fault appears to be internal to station A and the elements at station A will remove the restraint carrier for station B from the line and prepare its own coil for tripping. Station B recognizes the fault as external and accordingly maintains restraint carrier (frequency *f1*) on the line to prevent station A from tripping and does not prepare its own coil for tripping.

In the event of detection of an internal fault, it is apparent that the fault will appear as an internal fault to both stations and the lower relay elements of the effective panel relay at each station will operate its "*e*" and "*d*" contacts to perform the two functions heretofore described; that is, to stop the transmission of relay carrier from the associated terminal and to set up a circuit through the coil T in receiver relay 310. Since both restraining carriers are removed from the line, the H coil of the receiver relay at both stations will remain deenergized and as the "*e*" contacts close to energize the T winding to effect closure of contacts 310*a* and to effect the completion of an operating circuit for the trip coil 302 over a circuit extending from positive battery on conductor 312, over the winding of the trip coil 302, closed contacts 310*a*, the closed "*e*" contacts of the effective panel relay and conductor 343 to negative battery on conductor 313.

Thus, between the directionality of the local tripping relay and the restraint provided by carrier from the remote end tripping is confined to faults on the protected line. Additionally, the possibility of false restraint by the miscellaneous service frequency from the remote station is impossible by reason of the frequency inversion principle.

In some cases the upper elements (in the panels) which start relay carrier are made responsive to low voltages and the relay carrier stopping elements (the lower elements in the panels which are generally non-affected by low voltage as such) are to be used in conjunction with the auxiliary relay 326 to open the contacts 326*b* to stop relay carrier transmission. The non-relay carrier transmitter 311 then is arranged to be shut off only with energization of the lower elements which are unaffected by low voltage as by the opening of contacts 326*a*. Contacts 325*a* are then omitted from relay 325. The non-relay usages can then be continued even if the potential transformers such as 304 are connected to a deenergized line or a station bus.

In the event there is no current into the internal fault at station A, the relay transmitter at that end does not start, and frequency *f2* will not be transmitted from that end. With the corresponding absence of restraint on the receiver relay at station B, the circuit breaker equipment thereat will trip in the proper manner. If terminal B is without fault current, then terminal A can relay properly in a like manner, and the circuit breaker thereat will be opened to disconnect same from the source of fault current.

*Conclusion*

The power line protective arrangements which have been set forth in the foregoing are operable to provide extremely accurate and reliable control of assigned protected line sections.

The novel concept of effecting an inversion of frequencies, normally used between the stations for miscellaneous service purposes, responsive to detection of a fault provides an arrangement which affords a distinct divisional line of demarcation between the respective functions of the equipment. Additionally, the manner in which priority is awarded at all times to the relay carrier functions effects the provision of a system in which both the miscellaneous service function and the relay carrier function may be safely and reliably incorporated in a relay carrier system.

A particular advantage of the invention is the comparative simplicity and flexibility of the elements used in the practicing of the basic concepts of the invention. As a result, as shown previously herein, most of the better known types of carrier relaying equipment are readily adapted for use therewith through the addition of a comparatively few number of inexpensive elements and a minimum of adaptation requirements.

The comparative simplicity and economy, as well as the improved type of service which are inherent in the frequency inversion arrangement provide an improved protective system which is a definite advancement in the relay carrier art.

Various other features of the invention which are believed to be new are set forth in the accompanying claims.

We claim:

1. In a carrier relaying system having at least a first and second station, transmitter means at each station operative to transmit alternatively each of two predetermined signals over a protected line section, the two alternative signals to be transmitted by the first station being the same two signals as transmitted by the second station, signal means at each station operative at one of said stations to control its transmitter to normally transmit one of said two signals over said section, and operative at said other station to control its transmitter to normally apply the other of said two signals over said section, miscellaneous service means for extending special services between the two stations with application of said one and said other signals at said one and said other stations respectively, fault detection control means at each of said stations operative responsive only to detection of a fault thereby to terminate the normal signal transmission by the equipment at its local station and to control same to transmit its alternative signal, and relay carrier means at each station for controlling the connection of the protected line section to associated power supply busses in accordance with the signals which are transmitted by the respective stations responsive to the occurrence of a fault in the system.

2. In a carrier relaying system having at least a first and second station, transmitter means at each station adapted to transmit alternatively each of two predetermined signals (*f1*, *f2*) over a protected line section, signal means at each station operative at one of said stations to control its transmitter to normally apply the first one (*f1*) of said two signals to said section, and operative at said other station to control its transmitter to normally apply the second one (*f2*) of said two signals to said section, miscellaneous service means for extending special services between the two stations only with the application of said signal (*f1*) at said one station and said signal (*f2*) at said other station respectively, fault detection control means at each of said stations operative responsive to detection of a fault thereby to control the signal means at its associated station to terminate transmission of its normal signal and to transmit its alternative signal, and relay carrier means at each station for controlling the connection of the protected line section to associated power supply busses in accordance with the particular signals transmitted by the respective stations responsive to the occurrence of a fault in the system.

3. In a carrier relaying system having at least a first and second station, a convertible transmitter at each station adapted to transmit alternatively each of two predetermined signals over a protected line section, the two alternative signals to be transmitted by the first station being the same two signals as transmitted by the second station, signal means at each station operative at one of said stations to control the transmitter to normally apply one of said two signals to said section, and operative at said other station for controlling its transmitter to normally apply the other of said two signals to said section, miscellaneous service means for extending special services between the two stations with application of said one and said other signals at said one and said other stations respectively, fault detection control means at each of said stations operative responsive to detection of a fault thereby to control the transmitter at its associated station to terminate transmission of its normal signal and to transmit its alternative signal, and relay carrier means at each station for controlling connection of the protected line section to associated power supply busses in accordance with the particular signals transmitted by the respective stations responsive to the occurrence of a fault in the system.

4. In a carrier relaying system having at least a first and second station, a first and second transmitter at each station operative to transmit alternatively each of two predetermined signals over a protected line section, corresponding transmitters at the two stations being adjusted to transmit the same signals, signal means at each station operative to control said first transmitter at one of said stations to normally apply the first one of said two signals to said section, and operative at said other station to control the second transmitter at the second station to normally apply the other of said two signals to said section, miscellaneous service means for extending special services between the two stations only with application of said one and said other signals at said one and said other stations respectively, fault detection control means at each of said stations operative responsive to detection of a fault thereby to control the effective transmitter at its associated station to terminate transmission of its normal signal and to render effective the other transmitter thereat to transmit the alternative signal for its associated station, and relay carrier means at each station for controlling connection of the protected line section to the associated power supply busses in accordance with the particular signals transmitted by the respective stations with the occurrence of a fault in the system.

5. In a carrier relaying system having at least a first and second station, carrier frequency transmitter means at each station adapted to transmit alternatively each of two predetermined signals over a protected line section, the transmitter at the one station being arranged to transmit the same two carrier frequencies as the transmitter at the second station, signal means at each station operative at one of said stations to control the transmitter means thereat to normally apply the first one of said two signals to said section, and operative at said other station to control its transmitter to normally apply the second one of said two signals to said section, voice control means at each station for modulating said normally transmitted carrier frequencies with voice current, receiver means at each of said stations for demodulating the modulated frequency signals as received from the other station, fault detection control means at each of said stations operative responsive to detection thereby of a fault in the system to control the transmitter at its associated station to terminate transmission of its normal frequency signal and to transmit its alternative frequency signal, whereby the speech channel is interrupted and a new channel comprising the alternative signals is established, and relay carrier means at each station operative to control connection of the protected section to the associated power supply busses in accordance with the nature of the signals transmitted by the respective stations with the presence of a fault.

6. In a carrier relaying system having at least a first and second station, transmitter means at each station operative to transmit alternatively each of two predetermined signals over a protected line section, signal means at each station operative at one of said stations to control its transmitter to normally apply one of said two signals to said section, and operative at said other station to control its transmitter to normally apply the other of said two signals to said section, miscellaneous service means for extending special services between the two stations with application of said one and said other signals by said one and said other stations respectively, fault detection control means at each of said stations operative responsive to detection of a fault thereby to control the transmitter at its associated station to terminate transmission of its normal signal and to transmit its alternative signal, whereby with local detection of a fault said first station applies said other signal and said second station applies said one signal, relay carrier means at each station for controlling the connection of the protected line section to associated power supply busses in accordance with the signals transmitted by the respective stations with the occurrence of a fault, and selective means at each station for preventing response of its relay carrier means to the miscellaneous service signal normally applied to the section by its own transmitter.

7. In a carrier relaying system having at least a first and second station, transmitter means at each station including an oscillator unit adapted to oscillate alternatively at each of two predetermined frequencies, the two given frequencies at the first station being the same as the two given frequencies at the second station, signal means at each of said stations operative at one of said stations to control its transmitter to normally apply one of said two frequencies to said section, and operative at said other station to control its transmitter to normally apply the other of said two frequencies to said section, miscellaneous service means for extending special services between the two stations with application to said section of said one and said other frequencies by said one and said other stations respectively, fault detection control means at each of said stations operative responsive to detection of a fault thereat to control its transmitter to terminate transmission of its assigned normal signal and to transmit its alternative signal, and relay carrier means at each station for controlling the connection of the protected line section to associated power supply busses in accordance with the signals transmitted by the respective stations with the occurrence of a fault.

8. A carrier relaying system as set forth in claim 7 in which said oscillator at said first station includes a resistance-capacitance network normally tuned to said one frequency, and said oscillator at said second station includes a resistance-capacitance network normally turned to said second frequency, and in which said fault detection means at each station is connected to tune its associated tank circuit to its alternative frequency with detection of a system fault thereby.

9. A carrier relaying system as set forth in claim 7 in which said oscillator at each of said stations includes a tank circuit comprising an inductance-capacitance network having predetermined values for effecting the oscillation of the oscillators at said respective miscellaneous service frequencies, a further inductance element at said one station and a further capacitance element at said other station, connecting means controlled by said fault detector control means at said one station responsive to occurrence of a fault to connect said further inductance in said tank circuit and thereby adjust said oscillator at said one station to operate at its assigned carrier relaying frequency, and connecting means at said other station operated by said control means responsive to occurrence of detection thereat of a fault to connect said further capacitance element in said tank circuit to effect the oscillation of said oscillator at said second station at its assigned carrier relaying frequency.

10. A carrier relaying circuit as set forth in claim 7 in which said oscillator has associated therewith circuit determining elements for normally effecting the operation of said oscillators at said miscellaneous service frequency, normally closed contacts at said one station arranged to be operated by said control means thereat responsive to detection of a fault to remove a circuit element from the associated circuit determining arrangement to effect the operation of the oscillator at its assigned carrier relaying frequency, and normally open contacts at said other station which are operated by the control means thereat responsive to detection of a fault to insert a further circuit element in its associated circuit determining arrangement to cause the oscillator thereat to operate at its assigned carrier relaying frequency.

11. A carrier relaying system as set forth in claim 7 in which said oscillator at each of said stations includes a tank circuit including a reactance tube and associated circuit connected in shunt thereof for determining the frequency of oscillation thereof, and in which said fault detector control means at each of said stations are operative responsive to fault detection to vary the number of circuit elements connected in circuit with said reactance tube unit to thereby vary the reactive output thereof and the frequency of oscillation of said oscillator.

12. A carrier relaying system as set forth in claim 4 in which said first and second transmitters at each of said stations include oscillator units, each of which is connected to oscillate at the assigned transmitter frequency, and relay means associated with said fault detector control means operative responsive to detection of a fault to interrupt the energizing circuit for the oscillator associated with the miscellaneous service transmitter and to complete an operating circuit for the oscillator circuit associated with the relaying transmitter.

13. In a carrier relaying system having at least a first and second station, transmitter means at each station adapted to transmit alternatively each of two predetermined frequencies over a protected line section, signal control means at one of said stations for controlling its transmitter to normally apply one of said two frequencies to said section, signal means at said other station for controlling its transmitter to normally apply the other of said two frequencies to said section, miscellaneous service means for extending special services between the two stations with application of said one and said other signals by said one and said other stations respectively, fault detection control means at each of said stations operative responsive to detection of a fault thereby to control its associated transmitter to terminate transmission of its normal signal and to transmit its alternative signal, phase comparison type control means at each station for controlling the period of the transmissions of the alternative frequency signals, and comparer means for controlling connection of the station to associated power busses in accordance with the relative periods of transmission of the frequency signals transmitted by the respective stations with the occurrence of a fault.

14. In a carrier relaying system having at least a first and second station, transmitter means at each station adapted to transmit alternatively each of two predetermined frequencies over a protected line section, signal control means at one of said stations for controlling its transmitter to normally apply one of said two frequencies to said section, signal control means at said other station being connected to normally apply the other of said two frequencies to said section, miscellaneous service means for extending special services between the two stations with application of said one and said other signals by said one and said other stations respectively, directional comparison type fault detection control means at each of said stations operative responsive to detection of a fault thereby to control its associated transmitter to terminate transmission of its normal signal and to transmit its alternative signal, and trip control means at each station for controlling the connection of the protected line section to associated power supply busses in accordance with the signals transmitted by the respective stations with the occurrence of a fault.

15. In a control station of a carrier relaying system for use with at least one other station in controlling connection of a protected line section to an associated supply source, signal transmitting means at each station for transmitting alternatively only each of two predetermined signals, the transmitter at the first station being adapted to transmit the same two signals as the transmitter at the second station, means at the respective stations for controlling said transmitters to normally transmit different ones of said two signals to each other, means at each station for accomplishing a special service with application of said two given different signals to said section, and control means operative responsive to detection of a fault to terminate said normal signal transmission and to effect transmission of the other alternative two signals at the respective stations, and control means for accomplishing a carrier relaying function with application of said alternative signals to the section.

16. In a control station of a carrier relaying system for use with at least one other station, transmitter means operative to transmit alternatively each of two predetermined signals over a protected line section extending to the other station, signal control means for controlling said transmitter to normally transmit one of said two signals over said section, miscellaneous service means for extending a special service over said system with application of said one signal to said section, fault detection means operative responsive only to detection of a fault thereat to terminate the normal signal transmission by the transmitter and to control same to transmit the other of said signals over said system, relay carrier means for locally controlling the connection of the protected line section to associated power supply busses including comparing means operative to provide a predetermined control of said connection responsive to application of said one signal to said line only by a remote station, miscellaneous service means operative responsive to application of said other signal to said line by a remote station only to provide a given miscellaneous service, and discriminating means for preventing response of said relay carrier and miscellaneous service means to said one and said other signal respectively as applied to the section by the local transmitter.

17. The method of providing carrier relaying protection and miscellaneous service functions over a protected line section which extends between two control stations which comprises the steps of normally transmitting a first predetermined signal from said second station to said first station and a second predetermined signal from said first station to said second station, of modifying said signals to provide miscellaneous service functions at each of the stations in accordance with the nature of the signal modifications effected at the respective stations, of detecting faults in the system both external and internal to said line section, of removing said signals from said line responsive to detection of said fault, of transmitting said second signal from said first station and said first signal from said second station modified in accordance with the nature of the fault detected, and of accomplishing a carrier relaying protective function in accordance with the modifications of the first and second signals as effected at the respective stations.

18. In a carrier relaying system having at least a first and second station, carrier frequency transmitter means at each station adapted to transmit alternatively each of two predetermined signals over a protected line section, signal means at one of said stations for controlling its transmitter to normally apply one of said two signals to said section, signal means at the other station for controlling its transmitter to normally connect the other of said two signals to said section, miscellaneous service means including means for modulating said two carrier frequencies and receiving means for demodulating said carrier frequencies as received from the remote station, to thereby provide special services between the two stations with application of said one and said other signals to said section by said one and said other stations respectively, fault detection control means at each of said stations operative responsive to detection of a fault thereby to control its transmitter to terminate transmission of its normal signal and to transmit its alternative signal, phase comparison type control means at each station for controlling the period of transmission of the alternative frequency signal in accordance with the nature of the fault detected by its associated fault detection means, receiver means including comparison means at each station for comparing the local fault indications with the fault indication provided by the alternative frequency received from the other station, switch means at each station for normally connecting its end of the protected line section to associated power supply busses, and trip means at each station controlled by said comparer means to trip with detection by its fault detection means, only, of a fault in the system; to trip responsive to detection by said fault detection means at both stations of an internal fault on said section, and to maintain said circuit connection with detection by the fault detection means at both stations of a fault which is external to the section.

19. In a carrier relaying system having at least a first and a second station, transmitter means at each station operative to transmit alternatively each of two predetermined signalling frequencies over a protected line section, the transmitter means at the first station being operative to provide the same two signalling frequencies as the transmitter at the second station, signal means at one of said stations for controlling its transmitter to normally transmit one of two given frequencies over said section, signal means at said other station for controlling its transmitter to normally apply the other of said two frequencies over said section, miscellaneous service means for extending special service between the two stations with application of said one and said other frequencies at said one and said other stations respectively, fault detection means at each of said stations operative responsive only to detection of a fault thereat to terminate the normal signal transmission of its local station, and to control same to transmit the alternative signal therefor; trip control means at each station for effecting the local disconnection of the protected line section from an associated power supply bus, directional comparison means at each station for signalling said trip control means to accomplish disconnection of said protected section responsive to detection of a fault on said protected section, and control means at each of said stations operative in accordance with the nature of the carrier frequency received from the distant station responsive to detection of a fault thereat to alternatively restrain its associated means from tripping with indication of an external fault at both stations and to energize its associated trip control means with indication of an internal fault at both stations.

20. In a carrier relaying system having at least a first and a second station, a first transmitter means at each station operative to transmit a first given frequency and a second transmitter operative to transmit a second given frequency, signal means at one of said stations for controlling its first transmitter to normally transmit said first given frequency over said section, signal means at the other said stations for controlling its transmitter to normally transmit the second of said two frequencies over said section, miscellaneous service means for extending special services between the two stations with the application of said one and said other frequencies at said one and said other stations respectively, control means at each of said stations operative responsive to detection of a fault to terminate the normal signal transmission by its associated transmitter and to control the alternative transmitter at its local station to transmit its assigned signal, and comparer means at each station operative with detection only at its own station of an internal fault to effect the disconnection of the protected line section from the associated power supply busses at its station.

References Cited in the file of this patent

UNITED STATES PATENTS

| Number | Name | Date |
|---|---|---|
| 2,367,921 | Blackburn | Jan. 23, 1945 |
| 2,408,868 | Mehring et al. | Oct. 8, 1946 |

FOREIGN PATENTS

| Number | Country | Date |
|---|---|---|
| 216,924 | Great Britain | June 2, 1924 |
| 284,773 | Great Britain | Feb. 3, 1928 |
| 499,512 | Great Britain | Jan. 25, 1939 |
| 511,136 | Great Britain | Aug. 9, 1939 |